W. F. SCHROEDER.
Corn Planter.
No. 29,624.
Patented Aug. 14, 1860.
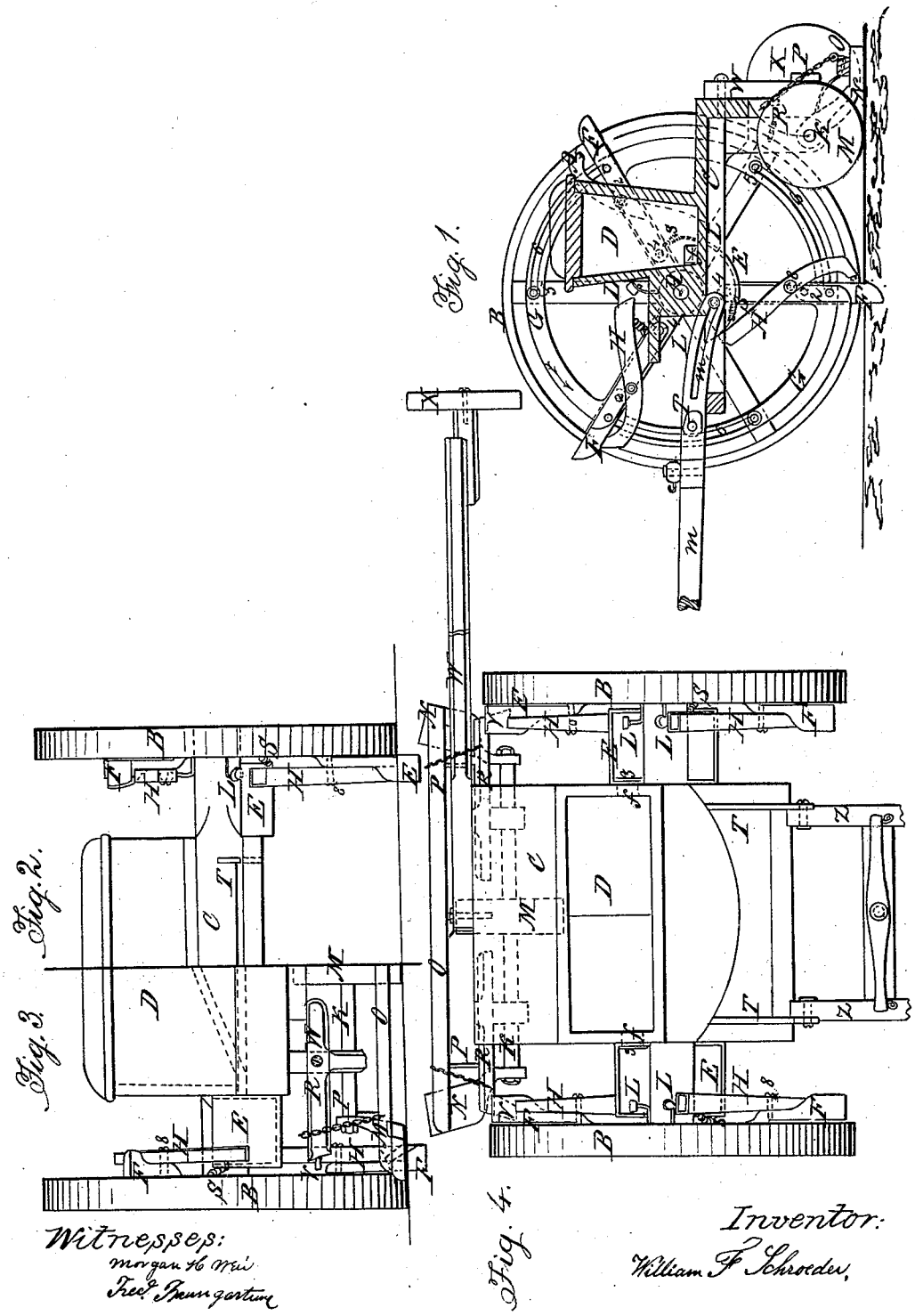

UNITED STATES PATENT OFFICE.

WILLIAM F. SCHROEDER, OF LA PORTE, INDIANA.

IMPROVEMENT IN SEED-PLANTERS.

Specification forming part of Letters Patent No. 29,624, dated August 14, 1860.

*To all whom it may concern:*

Be it known that I, WILLIAM F. SCHROEDER, of La Porte, in the county of La Porte and State of Indiana, have invented a new and Improved Corn or Seed Planter; and I do hereby declare that the following is a full and exact description of the same, reference being had to the accompanying drawings, and to the letters of reference marked thereon.

The nature of my invention consists in the arrangement of spades on the circumference of the wheels and connecting with the same the conducting-pipes for the seed, operated by a cam or by the seed-box, so as to discharge the seed, after the holes have been dug, into the same; secondly, in the arrangement for covering up the holes again after the seed has been deposited into the same, and of pressing the ground down upon the seed.

In the accompanying drawings, Figure I represents a longitudinal section; Fig. II, one half of a front view; Fig. III, one half of a back view, and Fig. IV, a plan of the machine.

Similar letters refer to similar parts.

A is the axle, to which the wheels B B are firmly attached.

C is the frame of the machine, upon which the seed-box D is fastened, the bottom of which is made slanting from the middle toward each side of the machine, to allow the seed to fall into the circular seed-boxes E, firmly attached on the outside on each side of the seed-box D. The openings for passages from the seed-box D to the circular boxes E E are provided with valves 3, Fig. IV, to regulate the quantity of seed passing from the box D, or to stop the same altogether when required.

F are spades attached to arms of the wheels B at 4 by means of bolts, and capable of turning on said bolts.

G is a ring fastened to the arms of the wheel by bolts 5 passing through the slots 6 in said ring. The spades F are attached to this ring G by bolts 2, and are consequently, through said ring, connected together. By turning the ring G forward in the direction of the arrow the distance which the spades project outside of the circumference of the wheel B will be reduced, or the extreme ends of said spades brought altogether inside the circumference. By this arrangement the depth the holes are to be dug can easily be regulated, or the spades thrown out of operation while going to and coming from the field.

H are pipes for conducting the seed to the bottom behind the spades F. The same are attached to the spades F by the pins 8, capable of turning on the same, and so constructed that the lower ends fit tight against the back part of said spades, by which the bottom opening is closed. The other end of said pipes H are attached to the spades by small springs S, so as to keep the bottom tight against the back part of the spades.

L are small cups or vessels attached to the wheels, and passing while revolving through the circular seed-boxes E to take the required amount of seed from said boxes and deliver them into the pipes H.

K is a shaft, on which a wheel, M, is placed to support the after end of the machine. On the ends of the shaft K scrapers N are loosely fastened and situated directly behind the spades F. These scrapers N are connected together by a bar, O, and are, by means of chains P, attached to one end of levers R, turning on pins $w$, fast to the back of the machines. The levers R have on the inner side, and directly in a line with the spades F, projections V, through which said levers are operated by the revolution of the spades, for the purpose hereinafter described.

The operation of the machine is as follows: By the forward motion of the machine and by the revolution of the wheels the cups L pass through the circular seed-boxes E, taking up the required quantity of seed and deposit the same in their passage round into the conducting-pipes H. The spades F will dig the holes the required depth, which may be regulated as above described. The upper end of that conducting-pipe H which is attached to the spade which at the time is digging comes then in contact with the outer circumference of the circular seed-box E, (or a cam may be attached to the machine for that purpose,) which presses that end outward, counteracting the action of the spring S, and thereby forces the lower end of said conducting-pipe away from the back of the spade, allowing the seed which has been thrown by the cup L into this conducting-pipe to fall into the hole made by the spade. The dug-up earth from the former hole is pushed forward by the scraper N and brought upon the seed, when, by the revolution of the spade, the same will come in contact with the projection V on the end of the lever R, lifting thereby said lever, and consequently the scrapers N, (which, as before mentioned, are attached to said lever R, by means of the chain P,) upward, and then allowing the same to fall down again by their own weight, thereby pressing or stamping the earth a little down upon the seed.

W is a bar fastened on the after end of the machine, capable of being turned toward either side required, and provided with a wheel, X, at its other end, which marks a line parallel with the one the machine plants, so as to guide the machine when returning to plant the seed parallel.

The shaft or pole Z, to which the horse is fastened to propel the machine, is fastened to the machine by means of hooks or plates T, provided with long slots $m$, for the purpose of stopping the machine and preventing breakage when the horse should go backward.

What I claim as my invention, and desire to secure by Letters Patent, is—

1. The manner of connecting and operating the spades for the purpose of regulating the depth the holes are to be dug, or to throw them out of operation when desired.

2. The arrangement of the conducting-pipes, in combination with the spades and feeding-cups, operated in the manner and for the purpose substantially as described.

3. The arrangement of scrapers when connected with levers operated by the spades, in the manner and for the purpose substantially as set forth.

WILLIAM F. SCHROEDER.

Witnesses:
   MORGAN U. WEIR,
   FRED. BAUMGARTNER.